United States Patent [11] 3,632,401

| [72] | Inventor | Joseph Sanlaville |
|---|---|---|
| | | Pierre-Benite, France |
| [21] | Appl. No. | 774,354 |
| [22] | Filed | Nov. 8, 1968 |
| [45] | Patented | Jan. 4, 1972 |
| [73] | Assignee | Ugine Kuhlmann |
| | | Paris, France |

[54] PROCESS FOR OBTAINING GRANULAR SOLIDS BY THE DECOMPOSITION OF GASEOUS REACTANTS
10 Claims, 3 Drawing Figs.

[52] U.S. Cl. .................................................. 117/100 B,
23/273 R, 75/212, 117/100 A, 117/100 C,
117/100 D, 117/100 M, 117/100 S, 117/107.2 R
[51] Int. Cl. ...................................................... C03c 25/04,
C23c 11/02
[50] Field of Search ............................................ 117/100,
107.2; 75/212

[56] References Cited
UNITED STATES PATENTS

| 2,563,475 | 8/1951 | Mahoney................... | 117/100 |
| 2,795,318 | 6/1957 | Morris........................ | 117/100 X |
| 2,824,723 | 11/1957 | Turney et al................ | 117/100 X |
| 2,930,767 | 3/1960 | Novak........................ | 117/107.2 X |
| 3,053,683 | 9/1962 | Yolles........................ | 117/107.2 X |
| 3,122,595 | 2/1964 | Oxley......................... | 117/107.2 X |
| 3,161,483 | 12/1964 | Morris........................ | 117/100 X |
| 3,202,537 | 8/1965 | Norman et al.............. | 117/107.2 X |
| 3,220,875 | 11/1965 | Queneau..................... | 117/107.2 X |
| 2,813,351 | 11/1957 | Godel......................... | 117/100 X |

Primary Examiner—William D. Martin
Assistant Examiner—Mathew R. P. Perrone, Jr.
Attorney—Webb, Burden, Robinson & Webb ABSTRACT: A process and apparatus for preparing granular solid products by decomposition of a gaseous reactant to form a solid phase comprising, first preparing at least one bed of particulate solids including relatively small seed particles, the particles within said bed providing a surface on which a solid phase is deposited. The temperature within the vessel and bed are maintained appropriate to the decomposition reaction. Seed particles and the metal carbonyl compound are continuously introduced into the bed. The bed is vibrated so that individual grains move relative to adjacent grains with a slight amplitude and the bed, itself, is continuously turned as the individual grains move generally in a closed circuit. Gaseous byproducts are removed from the bed and granular solids are recovered therefrom.

PATENTED JAN 4 1972

INVENTOR.
Joseph Sanlaville
BY
Webb, Burden, Robinson & Webb
ATTORNEYS

PROCESS FOR OBTAINING GRANULAR SOLIDS BY THE DECOMPOSITION OF GASEOUS REACTANTS

BACKGROUND

This invention relates to a process and devices for decomposing a gaseous reagent and recovering granular solids, that is, solids whose grain sizes are substantially between 0.1 and 20 mm. or greater. Many reactions utilizing gaseous reagents and producing a solid phase are known. These reactions are, more often than not, used when the desired solid must be a fine powder. Such processes are used, for example, when preparing fine pigments, preparing carbon blacks by heat cracking or incomplete burning of gaseous hydrocarbons, preparing finely divided titanium or silicon oxides by hydrolysis or oxidation in vapor phases of the corresponding chlorides.

Extremely pure metals can be prepared by gas phase decomposition processes because volatile compounds of some metals can be prepared with a high degree of purity. Therefore, precipitation of the metal by an appropriate chemical reaction results in a very pure product. The high degree of fineness of the metallic powders so prepared provide them with special properties. However, this fineness is often undesirable.

In nearly all of the reactions precipitating solids from a vapor phase, the nucleation, that is, the formation of fine grains, is much faster than their growing. Hence, it is difficult to obtain anything but fine powders. To obtain comparatively coarse powders or grains, it is necessary to choose reaction conditions in which the reaction is very slow. For example, the reactions must be carried out in a very dilute medium and/or carried out in the presence of a high concentration of seeds which provide a large surface area for deposition. These conditions may be realized by carrying out the reaction in a fluidized bed. Under such conditions, particles having a diameter up to 500 microns may be prepared. Unfortunately, it is not possible to obtain still larger grains because it is impossible to provide uniform stirring within a fluidized bed, particularly when it constitutes grains of high-density metals.

This invention provides a process and apparatus which enables precipitation of gaseous reactants to provide a granular solid, the diameter of which may be several millimeters. Furthermore, a continuous process is provided wherein the reactant gases and seed particles as small as 0.1 mm. are continuously introduced into a bed of solid particles, and solid grains having a diameter of several millimeters are continuously removed therefrom. This invention provides a process and apparatus wherein heat exchange between the bed and the heating or cooling sources is greatly facilitated. Plants carrying out the inventive process have high productivity.

THE INVENTION

According to this invention, there is provided a process for preparing granular solid products by decomposition of a gaseous reagent or reagents to form a solid phase. At least one particulate solid bed including relatively small seed particles is prepared. The particles within the bed provide a surface on which the solid phase is deposited. The temperature of the bed is maintained appropriate to the decomposition reaction. Seed particles and reactant gases are added to the bed. The bed is vibrated so that the grains within the bed move relative to adjacent grains with a slight amplitude and the bed is continuously turned as the individual grains move generally in a closed circuit. The byproduct gases are removed from the bed closed circuit. The reactants and granular solids are recovered therefrom. The reactants may be continuously fed to the bed and the granular solids continuously withdrawn therefrom.

The invention is explained in more detail with reference to the attached drawings in which the present preferred embodiments of the invention are shown in a simplified manner. In the drawings.

The particles comprising the bed may have the same chemical composition as the solid formed by the decomposition or a different composition in which case a composite particle having a core and coating is formed. The particles comprising the bed may be prepared independently or by crushing a part of the grains grown previously. They may have various forms when introduced and during the growing process, for example, granular metal, granules, crushed agglomerates, powder and so forth. The granulometric distribution or size grading of the grains comprising the bed may be very narrow or on the contrary, preferably spread between about 0.1 and 20 mm. The maximum size of the particles which can be recovered according to the process of the invention depends on the particular reaction and the operating conditions thereof. As the grain grows, the ratio between the area of the solid surface where deposition takes place and the volume of the particles within the bed is decreasing. Under some value of this ratio, nucleation begins, resulting in a powder product rather than a granular product. This mechanism establishes that it is not possible to cause grains to grow indefinitely.

The vibrating movement is imparted to the particles comprising the bed through the walls of a vessel which contain them. The vibration insures, on the one hand, a small amplitude displacement of each grain relative to the adjacent grains and on the other hand, a stirring which insures circulation of the solids within the bed. The swift and frequent displacement of grains relative to their neighbors prevents their becoming welded together by the deposition of material between them. At the same time, the vibration enables the whole surface of the grain to be in contact with the reactant gases and thus the grains grow in a regular manner. The stirring or turning of the bed in a generally closed circuit insures homogenization of the bed and prevents any dead zone. The vibrating movement enables the bed to be stirred even though at least a part of the bed comprises particles having a larger grain size and particles having high density. Hereinafter, such a bed will be referred to as a "vibrating bed." The overall movement of the particles within the bed depends on the geometric form of the vessel containing the bed and on the direction of the vibration.

Figure 1:
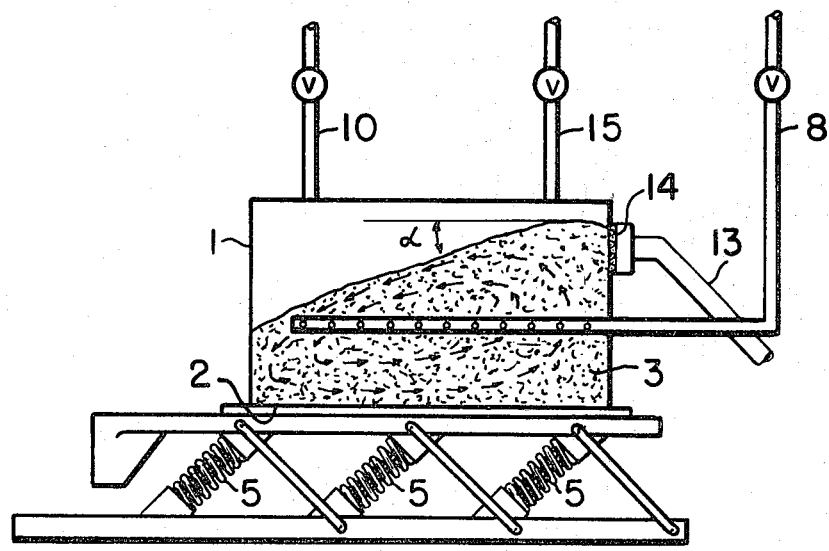
FIG. 1 shows a side view in section of a reaction vessel having a horizontal bottom.
Figure 2:
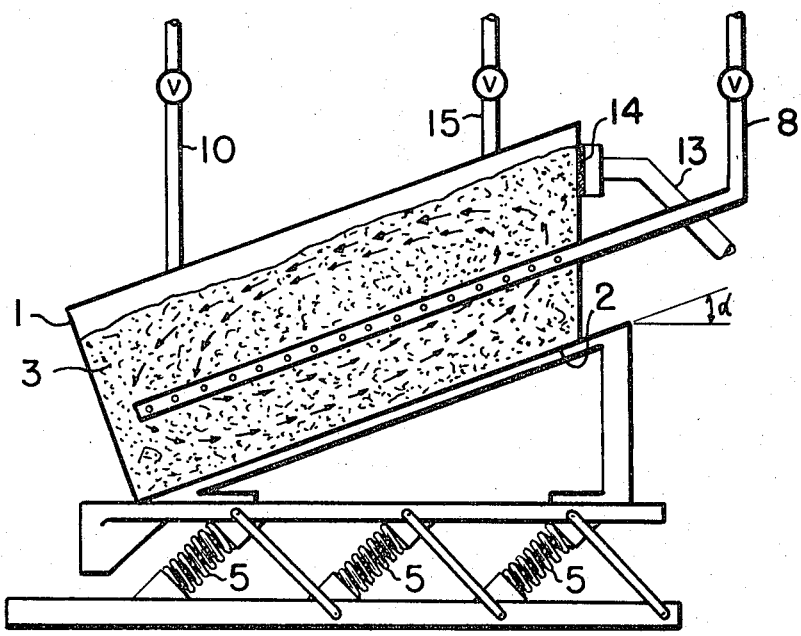
FIG. 2 shows a side view in section of a reaction vessel having an inclined bottom.

Referring to FIG. 1, the vessel 1 has a parallelepiped form with a horizontal bottom 2. The particulate solid bed 3 is contained within the vessel. The reactant gases are introduced through conduit 8 and the byproduct gases removed through conduit 15. Seeds are introduced through conduit 10 and fully grown grains removed through conduit 13. The vibration system 5 is secured to the vessel. Vibration is provided parallel to a side of the vessel. In this reactor the solid 7 moves in what approximates an elliptical path as shown by the arrows. In the lower part of the bed, the particles move in a direction parallel to the lower wall. Thereafter, they ascend to the upper part of the bed from which they flow in the opposite direction in order to return to the bottom. The surface of the bed is not horizontal but is inclined at an angle (shown as α in the drawings). In order to insure uniform stirring of the bed, it is preferable to cant the vessel as shown in FIG. 2. The surface of the bed is then parallel to the bottom of the reactor and the thickness of the bed is substantially uniform.

The reactor vessels for containing the vibrating bed may be cylindrical and have a vertical axis, wherein the bed moves about the circumference. In the center of such a bed, the circulation speed is very slow and, therefore, it is better to construct such a reactor in the form of a ring, i.e., annular. An elongate cylindrical reactor with a vertical axis may be used wherein the lateral walls are equipped with a helicord ramp or screw. The particles of the bed are moved upward by the ramp and fall back to the bottom by gravity. Many other forms of reactors may be conceived in which overall stirring of the solids is obtained by means of vibration.

The vibrating movement must be adapted to each particular vessel. It may be elliptic or rectilinear. Its direction should be inclined to the horizontal at an angle between 0° and 70°. The frequency of the vibration may vary within wide limits preferably from about 10 to 60 impulses a second. The amplitude of the vibration may preferably be between about 1 and 25 mm. Any of the devices, industrially known for producing such vibrating movements, may be used, which devices include electromagnetic poles, eccentric weights motors, push rod systems and so on.

The gaseous reagent must be introduced within the bed to insure a homogenous distribution thereof. Devices such as pipes having spaced openings therein inserted within the bed or sprayers may be used. The reagent may be liquid under ambient conditions and introduced to the bed as a liquid, if on contact with the fuel, gasification results. In most cases, it is necessary to cool the introducing devices in order to avoid the beginning of the reaction or decomposition before the reactant is within the bed. The byproduct gases produced during the reaction may be removed from the bed in any appropriate manner.

The vessel or reactor must have appropriate means for introducing seed grains and extracting fully grown particles. Preferably, the fully grown particles are removed from the bed by a mere pipe 13 apparatus functioning by overflowing and thereby maintaining a constant level in the reactor. Since the particles within the bed are different in diameter, the extracting device must be provided with a straining or screening system 14 in order that only the fully grown particles are removed. The growing process may be made more systematic by providing the reactor with a plurality of beds through which the growing seeds are successively passed.

The temperature at which the bed is maintained must be appropriate to the decomposition reaction employed, that is, it must be sufficiently high to cause decomposition which in most cases is above ambient temperature. In the case of decomposition of carbonyl-metal compounds, the temperature should preferably be maintained between 150° and 350° C. Therefore, it is necessary to provide means for heating the bed. On the other hand, these reactions are either endothermic or exothermic so the reactor must be equipped with devices to provide or to remove heat. One of the most economical means of heating is burning gases, but they are almost always incompatible with the reagents. In order to avoid pollution of a solid and not to dilute the byproduct gases so as to make their recovery more difficult, it is generally not possible to introduce burning gases inside the bed. The bed or the vessel is almost always heated indirectly through the vessel walls. As a result of the stirring, caused by vibration of the bed, the heat transfer between the wall of the vessel and the bed is very good. The conductivity within the bed is also enhanced by the stirring. As a result, heat may be introduced to the vessel by simply heating the outside of the vessel walls. It is also possible to insert within the bed tubes traversed by heat transfer fluids or hot gases or even shrouded electrical resistance elements.

The process according to this invention may be used to produce pure metals by the heat decomposition of carbonyl metals and in particular, in the production of pure iron by decomposition of pentacarbonyl iron. The metals so obtained have grains whose diameter is several millimeters. It is known that the decomposition reaction $Fe(CO)_5 \rightarrow Fe + 5CO$ is very endothermic. ($\Delta H_{298} = 55.7$ kilocalories per mole.) If the heat capacity of the products is taken into account, it is noted that the amount of 1,100 to 1,200 kilocalories per kilogram of iron product must be provided.

Carbonyl metals have been decomposed in empty large enclosures into which the gas is introduced. The decomposition must be accomplished before the vapor reaches the walls of the vessel. A very fine metallic product (several microns in diameter) is obtained which is suitable to some electrical and electromagnetic applications. The production of these apparatus is comparatively low considering their volume. It has also been proposed to prepare coarser powders, especially in the case of decomposition of carbonyl nickel, to contact the vapors with a fixed bed of metal grains from which the solids solely flows by gravity. But stirring of the particles relative to each other is slight and in order to prevent agglomeration, the growing speed must be very slow. Furthermore, in this type of apparatus it is difficult to provide the necessary heat because of the low or small heat transfer coefficients. The overall productivity of such an apparatus is obviously very limited. In reaction vessels wherein the volume is filled by granular material it is comparatively low to the total volume and the empty portion of the vessel contains carbonyl metal vapors, it is likely that very finely divided powder will be precipitated. It is desirable, therefore, to introduce the gaseous reactant under the bed of grains in order that it be entirely decomposed when arriving on the surface of the bed. In the case of rotating furnaces, having horizontal axes, the means for introducing the reactant gas must be rather complex, especially since the carbonyl metals are very toxic. Since the rotating furnaces are difficult to heat they have limited productivity.

The process according to this invention overcomes the above-described difficulties of producing metals by heat decomposition of carbonyl metals. The solution is economical, has a high productivity because of the high value of the heat transfer coefficients and the contact of the entire bed with the vapor phase. Furthermore, the apparatus for practicing this invention is simple and very strong.

It is not essential that the seeds have the same composition as the solid phase which is deposited by the decomposition of the gaseous phase. So it is possible to prepare powders which constitute one metal coated by another metal for example, it is possible to deposit iron on iron or chromium or nickel powders. Furthermore, refractory oxide powders may be coated with metal, for example, nickel on thorium oxide particles. This process is especially satisfactory for producing granular metals by decomposition of their carbonyl compounds, such as, carbonyl-iron, nickel, cobalt, chromium, molybdenum and tungsten.

Figure 3:
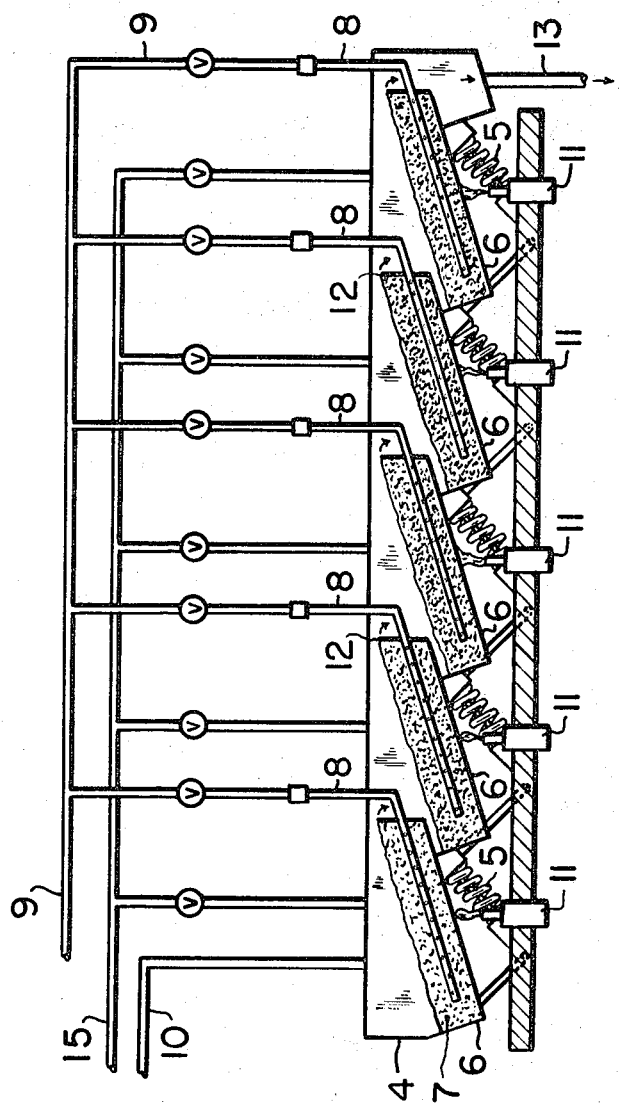
FIG. 3 shows a side view in section of a reaction vessel having a plurality of reaction beds.

Referring now to FIG. 3, an apparatus for practicing this invention may comprise an enclosure or vessel 4 fixed on a vibrating system 5. (The well-known driving devices are shown schematically as a helical spring with a push rod system.) In the vessel are a plurality of parallelepiped beds 6 whose inclination is 20° to the horizontal. Reactant gases are placed by a distributor 8 within each of the beds. The distributor is connected to a feed pipe such as 9. The distributor is cooled up to its penetration into the bed. This apparatus was used in the following process. Iron powder was introduced through orifice 10 into the first bed to provide a seed. Pentacarbonyl iron was injected through the pipes 8 and 9 by means of individual regulators. The byproduct gases were removed by orifice 15. The whole enclosure 4 and vibrating system 5 was placed into a furnace equipped with burners 11 the burning gases surrounding the enclosure 4. According to this alternate mode of this invention, the vibrating system may be outside the furnace and/or the gases may be channeled about the enclosure 4. The frequency of vibration corresponded to 750 impulses per minute. The amplitude was 22 millimeters and the direction of the vibration had a 50° angle to the horizon.

As stated above, the first vessel was fed with iron powder, the particles of which had an average diameter of 0.5 mm. to provide a seed. The solid moved from one bed to another by overflowing above the edges 12 thereby maintaining a constant level in each bed. The fully grown particles discharged through pipe 13. These particles had an average diameter of 2 mm. Carbon dioxide given off by the reaction discharged through the pipe systems 15. The temperature of the beds was substantially homogenous. It was maintained at about 250° C. Under these conditions the heat transfer coefficient between the internal wall and the bed was 380 kcal./hr./m.$^2$/°C. The heat conductivity of the bed was 143 kcal./m./hr./m.$^2$/°C. These very favorable heating properties permitted production rates from 300 to 350 kilograms of iron per hour per cubic meter of bed.

In the above-described system, the total volume of the reactor was 1.4 cubic meters and contained about 4.5 tons of iron powder. Nine hundred and forty-two kilograms per hour pentacarbonyl iron, that is, 0.643 cubic meters per hour were continuously introduced and were equally shared between the five beds. The yield of the decomposition reaction calculated either from the concentration of pentacarbonyl iron remaining in the evolved carbon dioxide (less than 0.01 percent by volume) or from the weight of the collected iron was always close to 100 percent.

Having thus described my invention with the detail and particularity required by the patent laws, what is desired to be protected by Letters Patent is as follows.

I claim:

1. A process for preparing granular solid products by decomposition of at least one metal carbonyl compound to form a solid phase comprising
   A. with a decomposition vessel having walls preparing at least one particulate solid bed including relatively small seed particles, the particles within said bed providing a surface on which a solid phase is deposited,
   B. maintaining the temperature within the bed appropriate to the decomposition reaction by indirect heating through the vessel walls,
   C. continuously adding seed particles to said bed and passing the the gaseous metal carbonyl compound through the bed,
   D. vibrating grains within the bed relative to adjacent grains with an amplitude from about 1 to 25 millimeters and in a manner to continuously turn the bed as the individual grains move generally in a closed circuit, and
   E. exhausting the byproduct gases from the bed and continuously recovering granular solid products therefrom.

2. A process according to claim 1 in which the metal carbonyl compound is the pentacarbonyl iron.

3. A process according to claim 1 in which the seed materials are of the same composition as the solid phase formed by deposition of the gaseous metal carbonyl compound.

4. The process according to claim 1 in which the granular seed materials introduced into the bed are of a composition different from the solid phase deposited by decomposition of the gaseous metal carbonyl compound.

5. A process according to claim 1 in which the metal carbonyl compound introduced in liquid form gasifies immediately passing through the bed.

6. A process according to claim 1 in which the diameter of the fully grown granules is between about 1 and 6 mm.

7. The process according to claim 1 in which the vibration has a frequency between about 10 and 60 impulses a second and an amplitude between about 1 and 25 mm., said vibration directed on an angle between about 25° and 70° to the horizontal.

8. A process according to claim 1 in which the gaseous metal carbonyl compounds are introduced within the bed at temperatures below their decomposition temperatures.

9. A process according to claim 1 in which the temperature of the vibrating bed is maintained between about 150° and 350° C.

10. A process according to claim 1 in which the granular seed material is sized less than about 0.1 mm.

* * * * *

UNITED STATES PATENT OFFICE
CERTIFICATE OF CORRECTION

Patent No. 3,632,401          Dated   January 4, 1972

Inventor(s)    Joseph Sanlaville

It is certified that error appears in the above-identified patent and that said Letters Patent are hereby corrected as shown below:

Column 3, line 27, "different in diameter" should read -- homogenous --. Claim 1, Column 5, line 20, "with" should read -- within --.

Signed and sealed this 6th day of June 1972.

(SEAL)
Attest:

EDWARD M. FLETCHER, JR.                ROBERT GOTTSCHALK
Attesting Officer                      Commissioner of Patents